US007693769B1

(12) United States Patent
Burlison et al.

(10) Patent No.: US 7,693,769 B1
(45) Date of Patent: Apr. 6, 2010

(54) SYSTEM AND METHOD FOR IDENTIFYING TAX SAVINGS OPPORTUNITIES FOR A TAXPAYER

(75) Inventors: Kathryn T. Burlison, Leawood, KS (US); Margaret C. Doedtman, Raytown, MS (US); Bradley K. Peak, Parkville, MO (US); Chrystine M. Sullivan, Kansas City, MO (US); Brian C. Tucker, Kansas City, MO (US); James Willoughby, Peculiar, MO (US)

(73) Assignee: HRB Tax Group, Inc., Kansas City, MO (US)

( * ) Notice: Subject to any disclaimer, the term of this patent is extended or adjusted under 35 U.S.C. 154(b) by 491 days.

(21) Appl. No.: 11/023,282

(22) Filed: Dec. 24, 2004

(51) Int. Cl.
G06Q 40/00 (2006.01)

(52) U.S. Cl. .................... 705/36 T; 705/36 R (58) Field of Classification Search ............... 705/705, 705/36, 35, 37, 38, 39
See application file for complete search history.

(56) References Cited

U.S. PATENT DOCUMENTS

| | | | | |
|---|---|---|---|---|
| 5,193,057 A * | 3/1993 | Longfield | ............... | 705/31 |
| 6,016,479 A * | 1/2000 | Taricani, Jr. | ............... | 705/19 |
| 6,064,986 A * | 5/2000 | Edelman | ............... | 705/36 R |
| 6,161,098 A * | 12/2000 | Wallman | ............... | 705/36 T |
| 6,192,347 B1 * | 2/2001 | Graff | ............... | 705/36 R |
| 6,202,052 B1 * | 3/2001 | Miller | ............... | 705/31 |
| 6,347,304 B1 * | 2/2002 | Taricani, Jr. | ............... | 705/19 |
| 6,401,079 B1 * | 6/2002 | Kahn et al. | ............... | 705/30 |
| 6,571,219 B1 * | 5/2003 | Spivey | ............... | 705/36 R |
| 6,604,080 B1 * | 8/2003 | Kern | ............... | 705/4 |
| 6,697,787 B1 * | 2/2004 | Miller | ............... | 705/31 |
| 6,751,596 B1 * | 6/2004 | Hastings | ............... | 705/10 |
| 7,016,873 B1 * | 3/2006 | Peterson et al. | ............... | 705/36 R |
| 7,043,448 B2 * | 5/2006 | Campbell | ............... | 705/31 |
| 7,107,239 B2 * | 9/2006 | Graff | ............... | 705/36 R |
| 7,234,103 B1 * | 6/2007 | Regan | ............... | 715/234 |
| 7,257,553 B1 * | 8/2007 | Baker | ............... | 705/31 |

(Continued)

OTHER PUBLICATIONS

Isaac M. O'Bannon, Tax Planning Strengthens Client Relationships, Oct. 4, 2004, (Sep. 2004 issue), The CPA Technology Advisor, pp. 6-7 of article devoted to Lacerte Tax Planner.*

(Continued)

*Primary Examiner*—Alexander Kalinowski
*Assistant Examiner*—Bruce I Ebersman
(74) *Attorney, Agent, or Firm*—Standley Law Group LLP (57) ABSTRACT

The present invention is a computerized tax savings tool for adjusting a taxpayer's taxable income to identify tax savings opportunities. The tax savings tool may be implemented as a component of a proprietary tax preparation software system that is used to prepare tax returns for taxpayer clients of a tax preparation firm. The tool automates the calculations of legal steps that a taxpayer may take to reduce his or her AGI on a current or a future tax return, which in turn enables the taxpayer to take advantage of additional adjustments, deductions, exemptions, credits, etc. provided by the tax code of the taxing authority. The tax savings opportunities are presented in one or more onscreen reports that may be reviewed by a tax return preparer and taxpayer. The onscreen report identifies specific actions that the taxpayer may take to reduce his or her taxable income, and therefore, related tax liability.

5 Claims, 6 Drawing Sheets

U.S. PATENT DOCUMENTS

| | | | |
|---|---|---|---|
| 2001/0037268 A1* | 11/2001 | Miller | 705/31 |
| 2002/0013747 A1* | 1/2002 | Valentine et al. | 705/31 |
| 2002/0046144 A1* | 4/2002 | Graff | 705/36 |
| 2002/0083024 A1* | 6/2002 | Myers | 705/500 |
| 2002/0111888 A1* | 8/2002 | Stanley et al. | 705/31 |
| 2002/0133410 A1* | 9/2002 | Hermreck et al. | 705/19 |
| 2002/0143693 A1* | 10/2002 | Soestbergen et al. | 705/37 |
| 2002/0178039 A1* | 11/2002 | Kennedy | 705/7 |
| 2003/0014351 A1* | 1/2003 | Neff et al. | 705/37 |
| 2003/0036912 A1* | 2/2003 | Sobotta et al. | 705/1 |
| 2003/0043262 A1* | 3/2003 | Takemoto et al. | 348/46 |
| 2003/0055754 A1* | 3/2003 | Sullivan | 705/31 |
| 2003/0093320 A1* | 5/2003 | Sullivan | 705/19 |
| 2003/0097324 A1* | 5/2003 | Speckman | 705/36 |
| 2003/0144947 A1* | 7/2003 | Payne | 705/37 |
| 2003/0182215 A1* | 9/2003 | Ringler et al. | 705/35 |
| 2003/0216995 A1* | 11/2003 | DePauw et al. | 705/37 |
| 2004/0078307 A1* | 4/2004 | Carver | 705/31 |
| 2004/0122759 A1* | 6/2004 | Spivey | 705/36 |
| 2004/0167798 A1* | 8/2004 | Hastings | 705/1 |
| 2004/0181470 A1* | 9/2004 | Grounds | 705/31 |
| 2004/0225581 A1* | 11/2004 | Wyle et al. | 705/31 |
| 2004/0243428 A1* | 12/2004 | Black et al. | 705/1 |
| 2004/0260566 A1* | 12/2004 | King | 705/1 |
| 2005/0043998 A1* | 2/2005 | Bross et al. | 705/19 |
| 2005/0055290 A1* | 3/2005 | Bross et al. | 705/31 |
| 2005/0131805 A1* | 6/2005 | Bross | 705/39 |
| 2005/0137967 A1* | 6/2005 | Ryan | 705/38 |
| 2005/0246190 A1* | 11/2005 | Sandor et al. | 705/1 |
| 2005/0261995 A1* | 11/2005 | Phelan | 705/31 |
| 2006/0085201 A1* | 4/2006 | Sultan | 705/1 |
| 2006/0155632 A1* | 7/2006 | Cherkas et al. | 705/36 R |
| 2006/0184445 A1* | 8/2006 | Sandor et al. | 705/37 |
| 2006/0242052 A1* | 10/2006 | Long et al. | 705/35 |
| 2007/0035548 A1* | 2/2007 | Jung et al. | 345/474 |
| 2007/0035549 A1* | 2/2007 | Jung et al. | 345/474 |
| 2007/0088581 A1* | 4/2007 | Treacy | 705/4 |
| 2007/0088582 A1* | 4/2007 | Treacy | 705/4 |
| 2007/0100707 A1* | 5/2007 | Driessen et al. | 705/26 |
| 2007/0150387 A1* | 6/2007 | Seubert et al. | 705/31 |

OTHER PUBLICATIONS

Intuit Press Release dated May 25, 2001, Detailing release of Lacerte Net Tax and Lacerte Tax Planner.*

Computer Aid for the Tax Wear, New York Magazine, Nov. 1984, pp. 39-42.*

Dorsey and Whitney LLP Publications- Year End Tax Planning 2004 (Summary on Internet).*

Lacerte Tax Analyzer 2003, pdf. 2 pages (press release for 1040 TAx Analyzer due in Jan. 2004.*

Stealth Taxes The real Cost of Hidden Tax Traps, Journal of Accountancy, Mar. 2001, pp. 1-6 Richard Boes and Gary R. Wells.*

Tame Your TAxes, Review of Tax Cut, PC Computing, Mar. 1991, p. 127.*

* cited by examiner

Potential Savings

300 — At least one of your tax credits or deductions has been limited because of your adjusted gross income (AGI). If you adjusted your AGI, you could qualify for additional deductions, for this return and next year's return.

| Item (302) | Maximum Savings (304) | | Midpoint of Savings (306) | | Minimum Savings (308) | |
|---|---|---|---|---|---|---|
| | Change | Savings | Change | Savings | Change | Savings |
| Saver's Credit | $ | $ | $ | $ | $ | $ |
| Childcare Credit | $ | $ | | | $ | $ |
| Earned Income Credit | $ | $ | | | $ | $ |
| Hope Scholarship Credit | $ | $ | | | $ | $ |

☐ —310 Check Schedule A savings?

SYSTEM AND METHOD FOR IDENTIFYING TAX SAVINGS OPPORTUNITIES FOR A TAXPAYER

FIELD OF THE INVENTION

The present invention relates generally to systems and methods for preparing tax returns. In particular, the present invention relates to a computerized system and method for automating the adjustment of a taxpayer's taxable income to identify and accommodate tax savings opportunities.

BACKGROUND OF THE INVENTION

When submitting tax returns, the IRS and many other taxing authorities allow a taxpayer to apply various adjustments, or subtractions, to the taxpayer's gross income. The applicable adjustments depend upon the taxpayer's filing status and the tax form that the taxpayer files. The applicable amounts are subtracted from the taxpayer's gross income to determine an adjusted gross income ("AGI"). AGI represents the taxpayer's gross income reduced by the applicable adjustments.

For a U.S. taxpayer paying taxes under the U.S. Tax Code, AGI may be reduced by taking various deductions that the IRS allows the taxpayer to subtract from his or her income. A standard dollar amount for each of five filing categories may be applied. A taxpayer has the option of using the preset, standard dollar amount or, if the taxpayer has tax-allowable expenses (such as mortgage interest, charitable contributions, large medical expenses) that are greater than the standard deduction amount, the amount of the expenses. To take advantage of the expenses, a taxpayer uses an IRS Form 1040 and itemizes the deductions on Schedule A. The Schedule A amount is then subtracted from the taxpayer's AGI.

The IRS also permits taxpayers to reduce income by using exemptions. Exemptions are provided for people who depend upon the taxpayer for financial support, such as a spouse, children, in some cases parents, and the taxpayer. The IRS allows the taxpayer to multiply the applicable number of people by a dollar amount (adjusted for inflation annually) and then subtract it from the taxpayer's income.

Finally, the IRS allows taxpayers to reduce their tax liability by applying credits to the amount of taxes owed. Under the U.S. Tax Code, certain taxpayers may be eligible for tax credits related to child care or adoption.

After the deductions and exemptions are applied to the taxpayer's income, the taxpayer's taxable income is determined. This amount is used to determine the taxpayer's tax bill. Tax credits may be applied to the taxpayer's tax liability. Therefore, it is beneficial to taxpayers to take all permissible deductions, exemptions, and credits to reduce their taxable incomes and therefore, their tax liabilities. However, determining which adjustments apply to a taxpayer can be difficult and time consuming. More importantly, in many instances, a taxpayer may further benefit from certain actions that would allow him or her to qualify for additional adjustments to reduce taxable income. Analyzing a taxpayer's situation to determine whether the taxpayer may take certain actions to qualify for additional adjustments requires the ability to examine outcomes or results as the taxpayer's situation is varied.

Current methods of computing a taxpayer's benefits from reduction of AGI are often completed by hand using various IRS tax forms. However, this process of using manual calculations is slow and imprecise. It is often too time-consuming to cover various scenarios. A taxpayer who uses some personal tax preparation software (i.e., software used by a taxpayer who prefers to prepare his or her own tax return) may be able to determine the tax-savings impact of an AGI change on his or her deductions, exemptions, and credits. However, to make this determination, the taxpayer must actually change a specific adjustment amount he or she entered so that the software can recalculate the entire return. Physically changing multiple entries in a tax software program is cumbersome, as the taxpayer must work back and forth among all available adjustments to determine the best possible outcome. Furthermore, it may lead to preparation of an inaccurate tax return if the provisional entries are not returned to the actual amounts applicable to the taxpayer's situation. Finally, neither method allows a professional tax return preparer and a taxpayer client to review together each potential adjustment. Therefore, there is a need for a general-purpose tool that assists multiple taxpayers in capitalizing on valid tax savings opportunities.

SUMMARY OF THE INVENTION

The present invention is a computerized system and method for adjusting a taxpayer's taxable income to identify tax savings opportunities. In an example embodiment, the tax savings tool of the present invention is a component of a proprietary tax preparation software system such as H&R Block's tax preparation software. The tool automates the calculations of legal steps that a taxpayer client may take to reduce his or her AGI on a current or a future tax return, which in turn enables the taxpayer client to take advantage of additional adjustments, deductions, exemptions, credits, etc. provided by the U.S. Tax Code. As may be apparent to one of skill in the art, the features and functionality of the present invention may be used with any tax code of any taxing authority that uses gross income adjustments to determine a taxpayer's tax liability.

DESCRIPTION OF EXAMPLE EMBODIMENTS

In an example embodiment of the present invention, the tax savings tool of the present invention uses tax data that has been entered into a tax preparation software system for each individual taxpayer client to determine whether reducing that taxpayer client's AGI affects the level of tax savings for the taxpayer. Because actual tax data is used, specific savings opportunities may be identified for every taxpayer client of the tax preparation firm.

A tax return preparer enters a taxpayer client's tax information into the tax-preparation software system that contains or is in communication with the tax savings component of the present invention. The tax savings component then analyzes the information from the tax preparation software and devises an onscreen report that details steps the taxpayer client could take to reduce AGI on the tax return being prepared, as well as steps the client could take to reduce AGI on the tax return for the following year. The component also generates a printed report of its findings and suggestions. A tax return preparer and taxpayer client may then review the information and discuss the tax savings opportunities that are available to the taxpayer client.

Initially, the tax return preparer may provide the taxpayer client with an introductory statement that explains the reason for addressing the taxpayer's AGI and the advantages related to changing the AGI on the current return. For example, the tax statement may say "when we encourage you to change your adjusted gross income (AGI), we're not telling you not to make as much money but rather suggesting that you consider making more of that money tax-deferred (retirement income, for example, isn't taxed until you withdraw it) or even exempt from tax altogether (qualified amounts pulled from a flexible spending arrangement to pay for medical or childcare expenses are never subject to tax). There are steps you may be able to take on your current return to reduce your AGI, which in turn will reduce your tax and may even qualify you for additional credits or deductions. And there may be even more ways to reduce your AGI on next year's return. Let's take a look at your particular situation."

Figure 1:
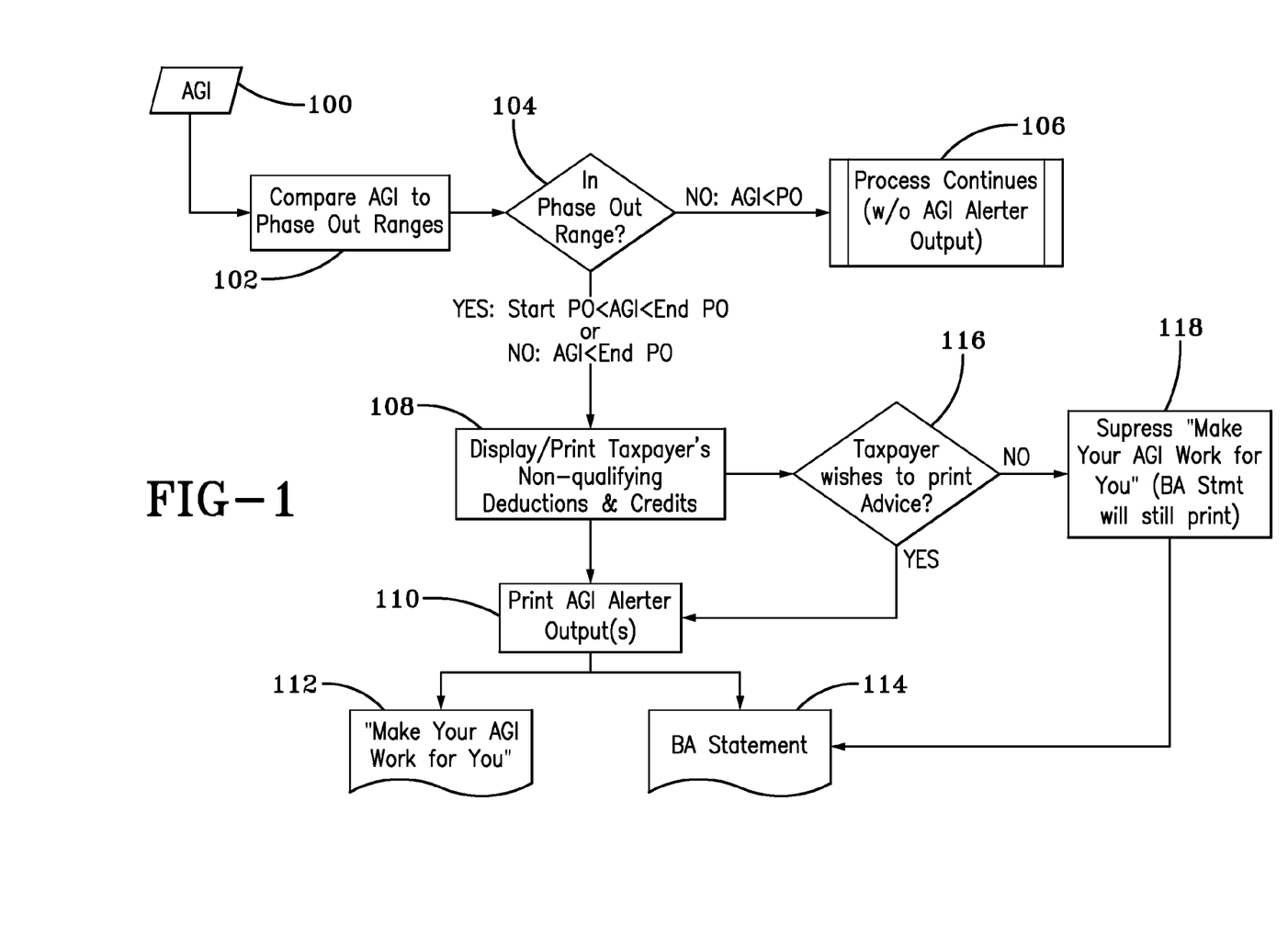
FIG. 1 is a flow diagram of a tax savings component or tool according to an example embodiment of the present invention.

Referring to FIG. 1, a flow diagram of a tax savings component or tool according to an example embodiment of the present invention is shown. The logic of a tax savings tool based on the U.S. Tax Code may be implemented as follows. When the tax savings component of the present invention is invoked 100, tax savings opportunities are first identified by comparing a taxpayer client's AGI with phase-out ranges for various deductions, exemptions, and credits 102. If a taxpayer's AGI falls within a phase-out range for a deduction, exemption, or credit, the taxpayer is permitted to apply only a pro-rated amount when determining his or her tax liability. As a result, the maximum amount that a taxpayer may use in determining a tax liability is limited.

Phase-out ranges typically differ depending upon a taxpayer's filing status. Also, the tax code may vary the applicable amount each year. For example, a taxpayer's eligibility to contribute to a Roth IRA depends on his or her income. Taxpayers with incomes that fall below the phase-out range may make a full Roth IRA contribution, taxpayers with incomes that fall within the phase-out range may make a limited contribution, and taxpayers with incomes that exceed the phase-out amounts may not make any contributions to a Roth IRA. The Roth IRA income phase-out ranges for 2004 are as shown in Table 1.

TABLE 1

| Tax Filing Status | Income Phase-Out Range |
|---|---|
| Married film jointly or Head of household | $150,000 to $160,000 |
| Single | $95,000 to $110,000 |
| Married film separately | $0 to $10,000 |

Furthermore, as shown in Table 2, Roth IRA annual contribution limits are varied by year as follows.

TABLE 2

| Year | Roth IRA Contribution Limit |
|---|---|
| 2002-2004 | $3,000 |
| 2005-2007 | $4,000 |
| 2008 and after | $5,000 |

Within a tax code, phase-out ranges may be applicable to various deductions, exemptions, and credits. Therefore, when identifying all potential tax savings opportunities, it is important to examine a taxpayer's AGI in relation to all applicable phase-out ranges. Phase-out ranges for various items under the U.S. Tax Code are provided in Appendices A and B.

In the next step, the taxpayer's AGI is compared to the phase-out range for the applicable deduction, exemption, or credit 104. If the taxpayer's AGI is below the start or lower limit of the phase-out range, no further action with respect to potential tax savings related to the applicable deduction, exemption, or credit is taken 106. If the taxpayer's AGI is within the range of the phase-out or the taxpayer's AGI is above the end or upper limit of the phase-out range, then explanatory information about the applicable deduction, exemption, or credit is displayed for the taxpayer 108. The tax return preparer and taxpayer may review together an onscreen or printed copy of the explanatory information 110 which identifies for the taxpayer potential tax savings opportunities. A taxpayer request for a printed copy of the explanatory information may be made in step 116. Even if the taxpayer decides not to receive a printed copy of the explanatory information, the taxpayer may still receive a printout comprising a personalized tax advice statement that provides information which may be of interest to the taxpayer (e.g., information about government assistance programs) 118. The process therefore, may produce both a printout of tax saving opportunities 112 (titled "Make Your AGI Work for You") and personalized tax advice 114 (titled "BA Statement").

Details regarding calculations performed to compare a taxpayer's AGI to phase-out ranges are shown in Table 3. Potential tax savings are then identified using these calculations.

TABLE 3

| | AGI Calculations |
|---|---|
| (a)= | start or lower limit of phase-out |
| (b)= | end or upper limit of phase-out |
| (c)= | AGI |
| (d)= | excess AGI over (a) ((c) − (a)) |
| (e)= | excess AGI over (b) ((c) − (b)) |
| (f)= | maximum excess over phase-out at which message will be generated. Assume $15,000 to start. |
| (g)= | amount claimed on return |
| (h)= | maximum amount that could be claimed on return |
| (i)= | (h) − (g) |

If (c)>(a) and (c)<(b) (i.e., AGI is within the phase-out range), a phase-out range message is generated. For example, the message may state "one or more of your tax credits or deductions have been limited because of your adjusted gross income (AGI)." Explanatory information may be provided following the message. Also, a future AGI reduction message is generated. The message may state "there are more ways to reduce your AGI for future years." The message may further include a list of items related to reduction of AGI.

If (e) is a positive figure and (e)<(f) (i.e., the amount is beyond the phase-out range but within maximum excess range), an excess AGI message is generated. The message may state "your adjusted gross income (AGI) is too high to allow you to benefit from one or more credits or deductions." Explanatory information may be provided following the message. Also, a future AGI reduction message is generated. The message may state "there are more ways to reduce your AGI for future years." The message may further include a list of items related to reduction of AGI.

If (i) is a positive figure, an AGI reduction message is generated. The message may state "there are several ways to reduce your AGI on your current tax return." A list of items for which the maximum deduction has not been claimed may be provided.

Depending upon the applicable tax code, various adjustments to the taxpayer's AGI may be applied and evaluated to determine whether the applicable tax code allows the taxpayer to take further actions to reduce his or her taxable income, and therefore, tax liability. Different income levels and/or phase-out limits or ranges as well as applicable tax code deductions, exemptions, and credits may have an impact on a taxpayers taxable income and/or tax liability. A variety of comparisons and calculations may be performed to determine the impact of each applicable adjustment (i.e., deduction, exemption, and credit) on the taxpayer's AGI and tax liability.

Figure 2A:
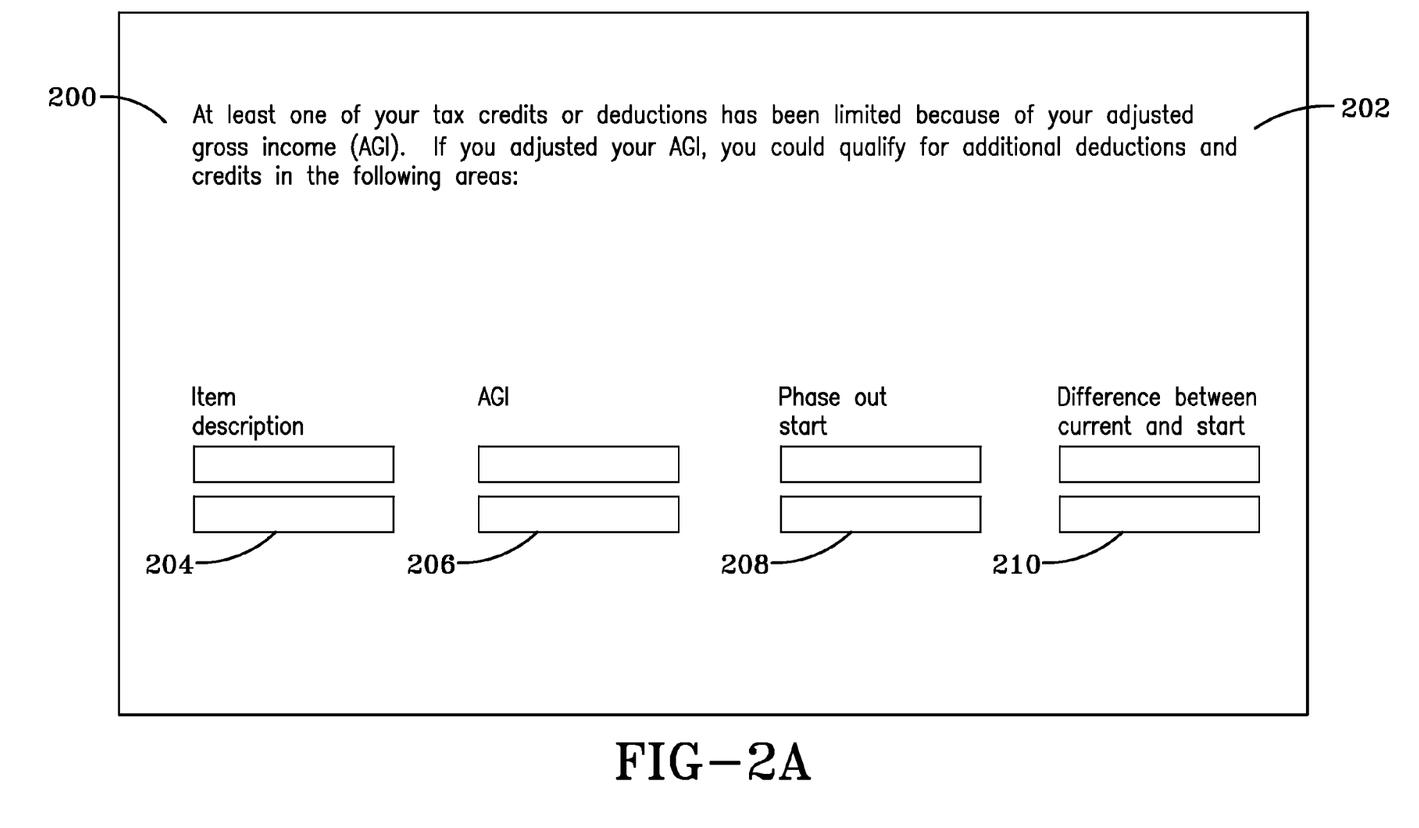
FIGS. 2A-2C are output screens according to a first example embodiment of the present invention.
Figure 2B:
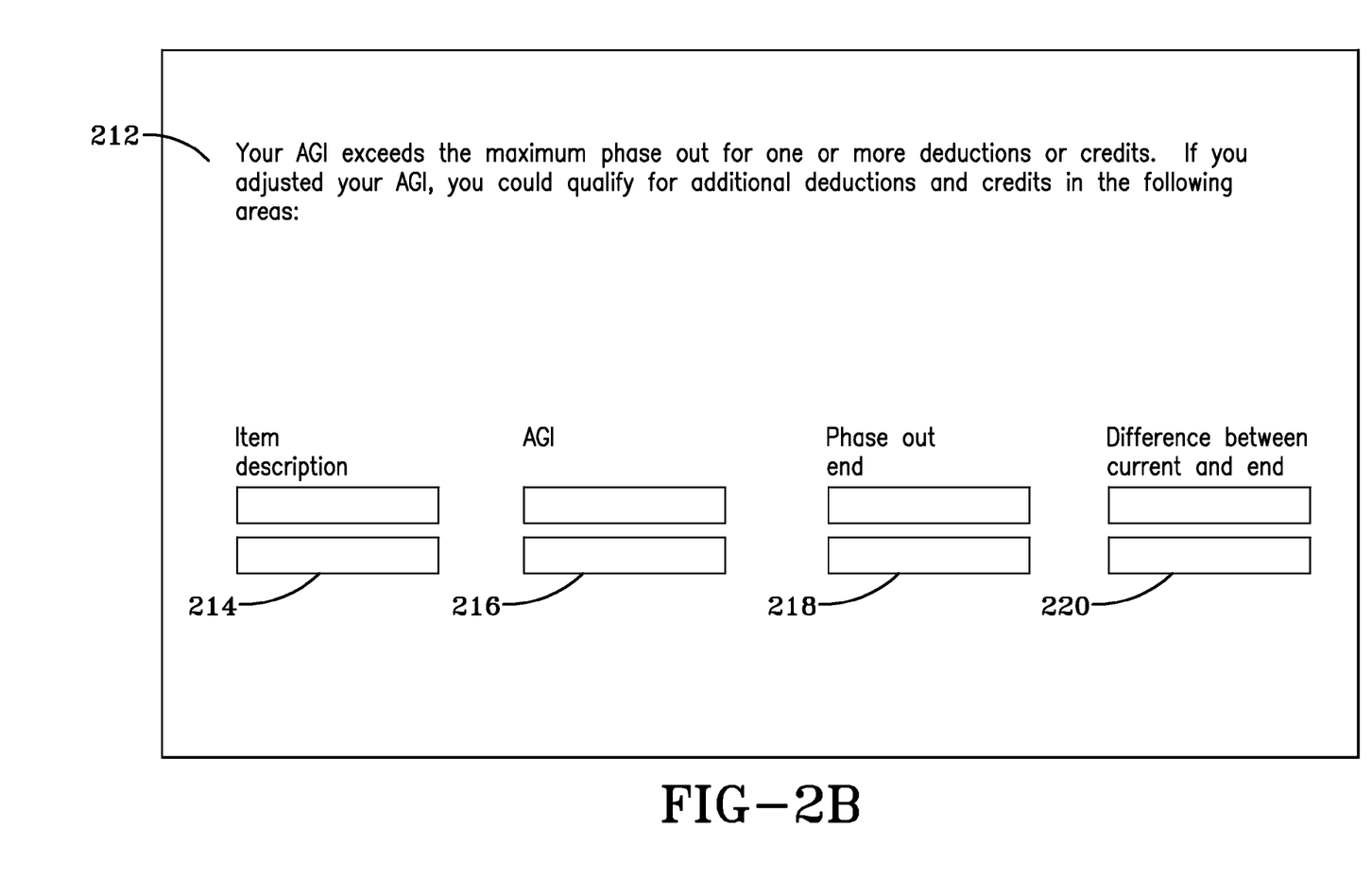
Figure 2C:
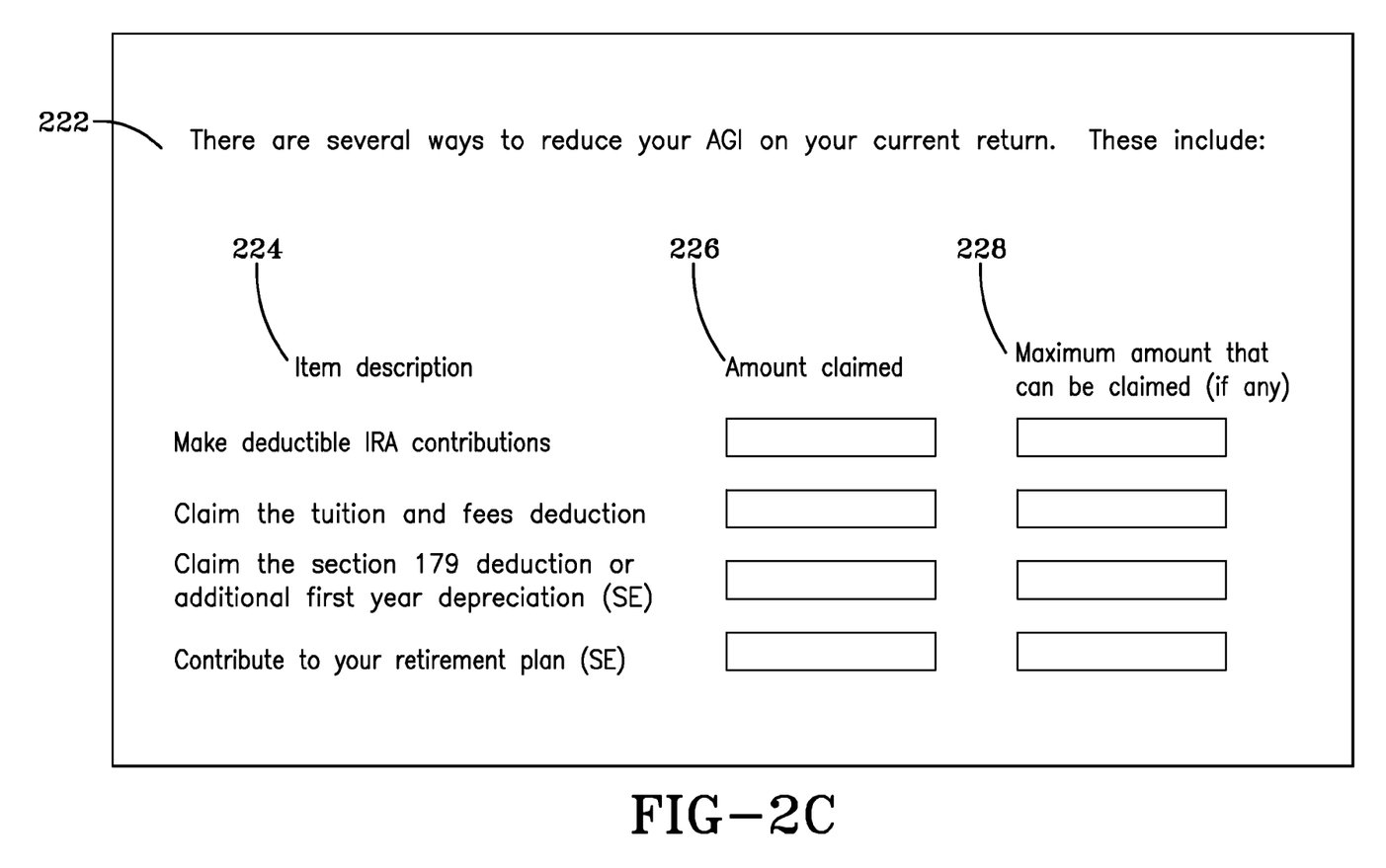

Referring to FIGS. 2A-2C, output screens according to a first example embodiment of the present invention are shown. Referring to FIG. 2A, an output screen providing explanatory information regarding a taxpayer's deduction or credit limits may comprise the following information: introductory sentence 200, phase-out introductory statement (generated if one or more items are in the AGI phase-out range) 202, item description 204 (for applicable items), AGI 206, phase-out start (or lower limit) 208, and difference between current and phase-out start 210.

Referring to FIG. 2B, if a taxpayers AGI exceeds a maximum phase-out, but is within an excess range such that reduction of the taxpayer's AGI would qualify the taxpayer for additional deductions or credits, explanatory information may be provided on the output screen as follows: an exceed phase-out introductory statement 212, item description 214 (for applicable items), AGI 216, phase-out end (or upper limit) 218, and difference between current and end 220.

Referring to FIG. 2C, the explanatory information may describe actions that a taxpayer may take to reduce AGI as follows: an introductory statement for actions that can be taken now 222 and a dynamic list of AGI modifiers including item description 224 (for applicable items), amount claimed 226, and the maximum amount that may be claimed 228. The output may further include introductory statements for actions that can be taken in future years and a static list of future AGI modifiers. Example text messages for future year actions are provided in the following table.

TABLE 4

Example Text Messages for Future Year Actions

Your adjusted gross income (AGI) is too high to allow you to benefit from one or more credits or deductions. Here are some ways you might reduce your AGI for future years:
Put as much of your salary as you can afford into your 401(K) or other company retirement plan.
Take advantage of other pre-tax benefits your employer offers. For example, sign up for flexible spending arrangements, or pay your health or disability insurance premiums with pre-tax dollars.
If you change jobs, don't withdraw the money from your former employer's retirement plan. Or withdraw it and roll it over to an IRA or other retirement plan.
To the extent possible, target any out-of-pocket higher-education payments to tuition and fees rather than, say, room and board.
Make the payments on your student loans. You may be able to claim the interest on these loans as an adjustment to your gross income.
If you're self-employed, delay billings until 2005. Also, contribute to a self employed requirement plan, and if you don't have other health insurance, set up a self-employed health insurance plan.
To the extent your income allows, make deductible contributions to a traditional IRA.

Figure 3A:
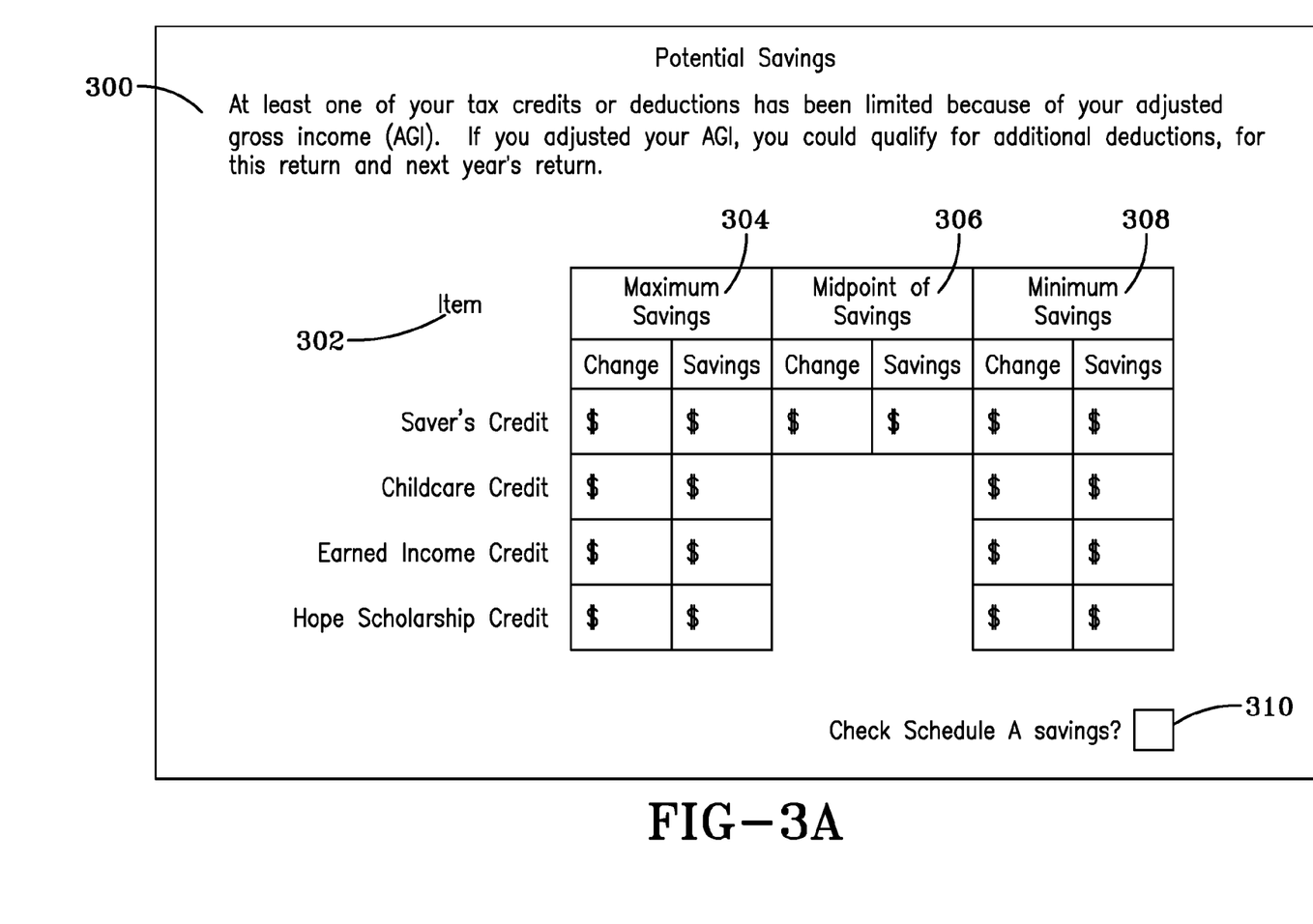
FIGS. 3A and 3B are output screens according to a second example embodiment of the present invention.
Figure 3B:
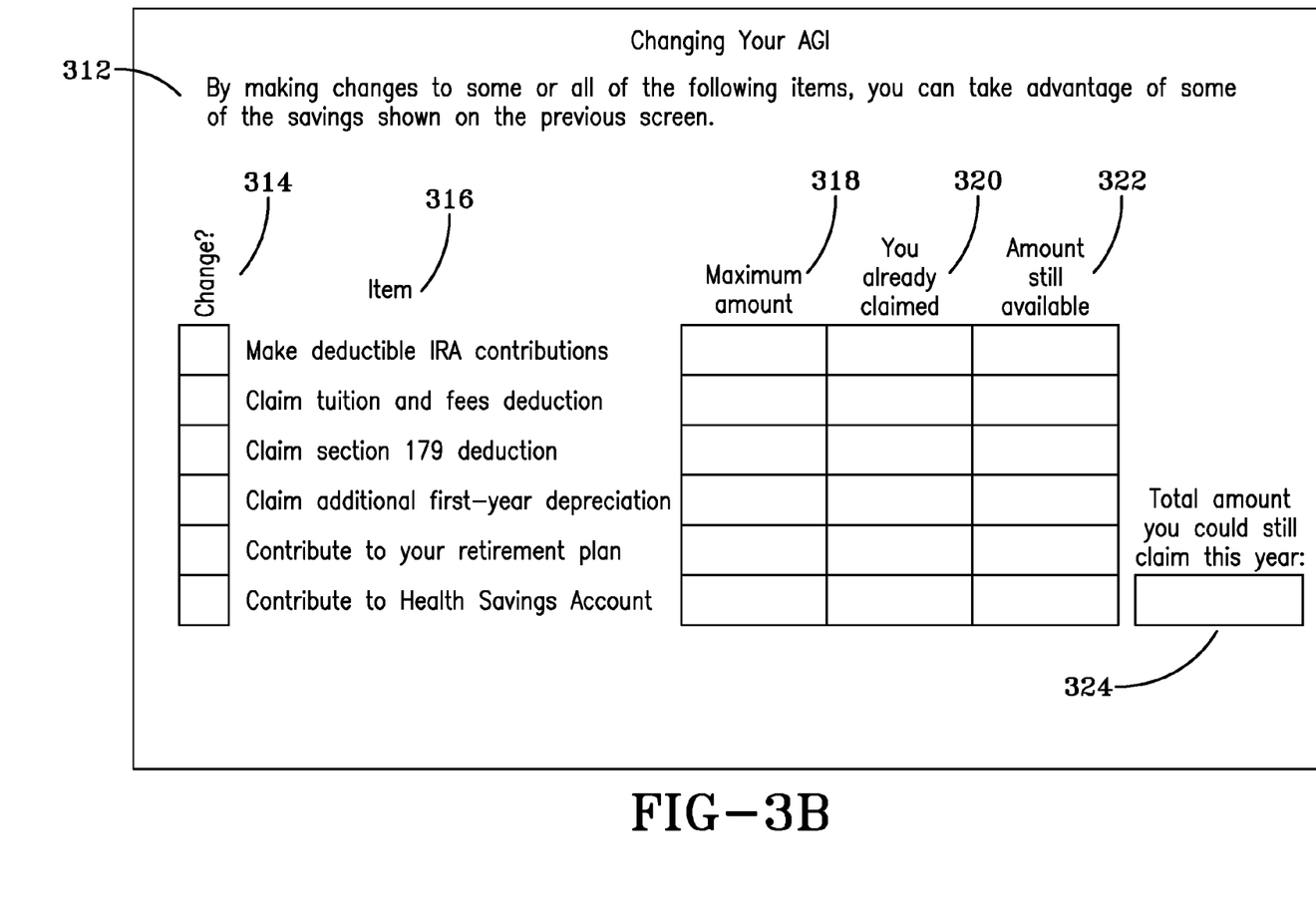

Referring to FIGS. 3A and 3B, output screens according to a second example embodiment of the present invention are shown. Referring to FIG. 3A, a potential tax savings output screen comprises an introductory statement 300 and a table that shows the amount by which AGI needs to change to generate tax savings. This output is provided when the taxpayer's AGI is greater than the lower phase-out limit, the taxpayer's AGI without adjustments is less than the upper phase-out limit, and the qualifications for the applicable deduction or credit are met except for the level of the taxpayer's AGI (IRA deduction excepted). Adjustments to current AGI may include the following:

1. Health Savings Account (HSA) adjustment to maximum deduction if Form 8889 is present
2. Individual Retirement Account (IRA) adjustment to maximum deduction
3. SEP/SIMPLE/Qualified Plan adjustment to maximum deduction if Schedules C, F, or K1-P (with self-employment) are present
4. Section 179 expense adjustment to maximum deduction if depreciation is present and item is in first year of service
5. 50% Bonus depreciation if depreciation is present and item is in first year of service and basis is positive after Section 179 deduction
6. Tuition & Fees deduction to maximum deduction if education expenses (e.g., Tuition & Fees or Form 8863) are present The output screen comprises a dynamic table of items for which the taxpayer client's AGI or adjusted AGI is within the phase-out range. The table shows an item description of the applicable deduction or credit 302 and a related maximum tax savings column 304 and minimum tax savings column 308. The midpoint column of tax savings 306 appears for items that have a midpoint cliff (e.g., under the current U.S. Tax Code, the Retirement Savings Contributions credit, commonly known as the Saver's credit). Within each column, the "change" subheading refers to the difference in current AGI and maximum AGI needed to fall within the specific column and the "savings" subheading refers to the amount of deduction or credit received by the suggested change in AGI.

Because Schedule A savings apply differently from the tax savings shown on the sample screen of FIG. 3A, a pop-up may be used to show such savings appropriately. The pop-up may appear when a "Check Schedule A savings?" option is selected. If the Schedule A in the current return has values in the medical and/or miscellaneous deductions fields (subject to 2% of AGI), and itemized deductions are present, a Schedule A deduction pop-up is applicable. Rather than minimum and maximum tax savings, the pop-up shows a table with additional Schedule A deductions based on set AGI reductions. An "item" column describes the deduction and amount of the current expense for that deduction. A "current deduction" column shows the amount of the deduction with the taxpayer's current AGI. An "allowable deduction" column shows the level of deduction if the taxpayer's AGI is reduced by certain dollar amounts (e.g., $2,000 and $5,000). For example, if a taxpayer's AGI is $24,000, the allowable deductions may vary as shown in Table 5.

TABLE 5

| | | Allowable deduction if: | |
|---|---|---|---|
| Item | Current deduction | AGI $2,000 lower | AGI $5,000 lower |
| Medical (total: $5,000) | $3,200 | $3,350 | $3,575 |
| Misc. (total: $600) | $120 | $160 | $220 |

Referring to FIG. 3B, an AGI change impact output screen comprises an introductory statement 312 and a table that identifies items that the taxpayer may take advantage of to realize the potential tax savings shown in FIG. 3A. This output is provided if the maximum amount that could be claimed on the taxpayer's tax return less the actual amount claimed on the return is a positive number. Items that may be included in the output are:
1. Health Savings Account (HSA) deduction
2. Individual Retirement Account (IRA) deduction
3. SEP/SIMPLE/Qualified Plan deduction
4. Section 179 expense deduction
5. 50% bonus depreciation deduction
6. Tuition & Fees deduction The table shows an item description 316 of the applicable deduction or credit, the maximum deduction or credit for the item 318 (maximum amount of contribution or expense used to create the deduction or credit), the amount already claimed by the taxpayer 320 as shown on the taxpayer's tax return, and the amount still available to the taxpayer to claim 322 which is the difference between the maximum amount and the amount already claimed. The amounts in the "amount still available" column 322 may be added to determine a "total amount you could still claim" 324. In an example embodiment of the present invention, the calculations take into account the taxpayer's current AGI so as not to over-inflate the amount of the reduction. A "change" option 314 for each item allows the taxpayer to determine the impact on tax savings if the applicable action is taken.

In addition to identifying potential tax savings for the current tax year, the present invention may be used to identify potential tax savings for future tax years. The content of the output screen for FIG. 3A as well as the Schedule A pop-up may be modified to notify a taxpayer of future year tax savings opportunities. Potential tax savings for future tax years may be identified in the output screen of FIG. 3A if the maximum amount that could be claimed on the taxpayer's return is less than the actual amount claimed on the return. The items that may be included in the output are Health Savings Account (HSA) deductions, traditional Individual Retirement Account (IRA) contributions, SEP/SIMPLE/Qualified Plan deductions, and Tuition and Fees deductions. The Schedule A pop-up may be used to identify additional tax savings for future years if the Schedule A in the taxpayer's current tax return has values in the medical and/or miscellaneous deductions (subject to 2% of future year AGI) fields and itemized deductions are present in current year.

The tax savings tool of the present invention adds precision to the computation of a client's potential AGI if certain allowed modifications to the AGI are made. It also has the advantage of using actual tax return data, as opposed to conjectural information that is often required by personal tax-planning software. Although actual tax return data is used, the tax savings opportunities calculations are separated from the tax return calculations so that data on the tax return is not affected by the tax savings opportunities calculations. Finally, because the tax savings tool is used jointly by a professional tax return preparer and the tax-preparation client, it has the advantages of the precise computations described above and the tax return preparers ability to use his or her familiarity with the taxpayer client's specific situation to make personal recommendations for that particular client.

While example embodiments of the invention have been illustrated and described, various modifications and combinations can be made without departing from the spirit and scope of the invention. For example, the available deductions, exemptions, and credits available to taxpayers may vary by tax code. Furthermore, the output related to various taxpayer situations and calculations may be provided in different screens and formats and still fall within the scope of the present invention. Modifications, combinations, and equivalents to the system and method of the present invention are intended to be covered and claimed.

APPENDIX A

| | | Start or Lower Limit of Phase-out Range | | | | | |
|---|---|---|---|---|---|---|---|
| Type | Credit/Deduction | | Single (S) | Head of Household (HH) | Married Filing Separate (MFS) | Married Filing Joint (MFJ) | Qualifying Widower (QW) |
| IRA | Traditional deductible - Taxpayer (& Spouse if applicable) Not Covered by Employer Plan | | No limit on deduction | No limit on deduction | No limit on deduction | No limit on deduction | No limit on deduction |
| IRA | Traditional deductible - Taxpayer (& Spouse if applicable) Covered by Employer Plan | NLWS LWS | 45,000 | 45,000 | 45,000 0 | 65,000 | 65,000 |
| IRA | Traditional deductible - Taxpayer not covered by Employer Plan and Spouse is covered by Employer Plan | | n/a | n/a | n/a | 150,000 | n/a |

APPENDIX A-continued

Start or Lower Limit of Phase-out Range

| Type | Credit/Deduction | | Single (S) | Head of Household (HH) | Married Filing Separate (MFS) | Married Filing Joint (MFJ) | Qualifying Widower (QW) |
|---|---|---|---|---|---|---|---|
| IRA | Roth Contribution | NLWS | | | | | |
| | | LWS | 95,000 | 95,000 | 150,000 | 95,000 | 95,000 |
| IRA | Roth Conversion | | 100,000 | 100,000 | 100,000 | 100,000 | 100,000 |
| Education | Lifetime Learning | | 42,000 | 42,000 | 42,000 | 85,000 | 42,000 |
| Education | Hope | | 42,000 | 42,000 | 42,000 | 85,000 | 42,000 |
| Education | Tuition and fees deduction | $4,000 | 65,000 | 65,000 | 65,000 | 130,000 | 65,000 |
| | | $2,000 | 65,001 | 65,001 | 65,001 | 130,001 | 65,001 |
| Education | ESA Contribution | | 95,000 | 95,000 | 95,000 | 190,000 | 95,000 |
| Education | EE/I Bonds | | 59,850 | 59,850 | 59,850 | 89,750 | 59,850 |
| Education | Student loan interest | | 50,000 | 50,000 | 50,000 | 100,000 | 50,000 |
| Schedule A | Miscellaneous | | Amount over 2% of AGI | | | | |
| Schedule A | Medical | | Amount over 7.5% of AGI | Amount over 7.5% of AGI | Amount over 7.5% of AGI | Amount over 7.5% of AGI | Amount over 7.5% of AGI |
| Schedule A | Phase-out | | 142,700 | 142,700 | 71,350 | 142,700 | 142,700 |
| Children | Child Care Credit | | 15,000 | 15,000 | 15,000 | 15,000 | 15,000 |
| Children | Child Tax Credit | | 75,000 | 75,000 | 55,000 | 110,000 | 75,000 |
| Children | Additional Child Tax Credit | | 10,750 | | | | |
| | Rental Real Estate | | 100,000 | 100,000 | 50,000 | 100,000 | 100,000 |
| | Social Security | 0% taxable | 0 | 0 | 0 | 0 | 0 |
| | | 50% (85% above phase-out) | 25,001 | 25,001 | 0 | 32,001 | 25,001 |
| | Saver's Credit | 50% | 0 | 0 | 0 | 0 | 0 |
| | | 20% | 15,001 | 22,501 | 15,001 | 30,001 | 15,001 |
| | | 10% | 16,251 | 24,376 | 16,251 | 32,501 | 16,251 |
| | EIC (No. of Qualifying Children) | 1 | 14,050 | 14,050 | EIC n/a | 15,050 | 14,050 |
| | | 2+ | 14,050 | 14,050 | | 15,050 | 14,050 |
| | | 0 | 6,400 | 6,400 | | 7,400 | 6,400 |
| | Exemption Phase-out | | 142,700 | 178,350 | 107,025 | 214,050 | 214,050 |
| | Adoption Credit | | 155,860 | 155,860 | n/a unless married living apart | 155,860 | 155,860 |

NLWS—Not Living with Spouse
LWS—Living with Spouse

APPENDIX B

End or Upper Limit of Phase-out Range

| Type | Credit/Deduction | | Single (S) | Head of Household (HH) | Married Filing Separate (MFS) | Married Filing Joint (MFJ) | Qualifying Widower (QW) |
|---|---|---|---|---|---|---|---|
| IRA | Traditional deductible - Taxpayer (& Spouse if applicable) Not Covered by Employer Plan | | No limit on deduction | No limit on deduction | No limit on deduction | No limit on deduction | No limit on deduction |
| IRA | Traditional deductible - Taxpayer (& Spouse if applicable) Covered by Employer Plan | NLWS | | | 55,000 | | |
| | | LWS | 55,000 | 55,000 | 10,000 | 75,000 | 75,000 |
| IRA | Traditional deductible - Taxpayer not covered by Employer Plan and Spouse is covered by Employer Plan | | n/a | n/a | n/a | 160,000 | n/a |
| IRA | Roth Contribution | NLWS | | | 10,000 | | |
| | | LWS | 110,000 | 110,000 | 110,000 | 160,000 | 110,000 |
| IRA | Roth Conversion | | 100,000 | 100,000 | 100,000 | 100,000 | 100,000 |
| Education | Lifetime Learning | | 52,000 | 52,000 | 52,000 | 105,000 | 52,000 |
| Education | Hope | | 52,000 | 52,000 | 52,000 | 105,000 | 52,000 |
| Education | Tuition and fees deduction | $4,000 | 65,000 | 65,000 | 65,000 | 130,000 | 65,000 |
| | | $2,000 | 80,000 | 80,000 | 80,000 | 160,000 | 80,000 |
| Education | ESA Contribution | | 110,000 | 110,000 | 110,000 | 220,000 | 110,000 |
| Education | EE/I Bonds | | 74,850 | 74,850 | 74,850 | 119,750 | 74,850 |
| Education | Student loan interest | | 65,000 | 65,000 | 65,000 | 130,000 | 65,000 |
| Schedule A | Miscellaneous | | | | | | |
| Schedule A | Medical | | | | | | |
| Schedule A | Phase-out | | | | | | |
| Children | Child Care Credit | | 43,000 | 43,000 | 43,000 | 43,000 | 43,000 |
| Children | Child Tax Credit | | Based on # children | Based on # children | Based on # children | Based on # children | Based on # children |

APPENDIX B-continued

End or Upper Limit of Phase-out Range

| Type | Credit/Deduction | | Single (S) | Head of Household (HH) | Married Filing Separate (MFS) | Married Filing Joint (MFJ) | Qualifying Widower (QW) |
|---|---|---|---|---|---|---|---|
| Children | Additional Child Tax Credit | | | | | | |
| | Rental Real Estate | | 150,000 | 150,000 | 75,000 | 150,000 | 150,000 |
| | Social Security | 0% taxable | 25,000 | 25,000 | 0 | 32,000 | 25,000 |
| | | 50% (85% above phase-out) | 34,000 | 34,000 | 0 | 44,000 | 34,000 |
| | Saver's Credit | 50% | 15,000 | 22,500 | 15,000 | 30,000 | 15,000 |
| | | 20% | 16,250 | 24,375 | 16,250 | 32,500 | 16,250 |
| | | 10% | 25,000 | 37,500 | 25,000 | 50,000 | 25,000 |
| | EIC (No. of Qualifying Children) | 1 | 30,338 | 30,338 | EIC n/a | 31,338 | 30,338 |
| | | 2+ | 34,458 | 34,458 | | 35,458 | 34,458 |
| | | 0 | 11,490 | 11,490 | | 12,490 | 11,490 |
| | Exemption Phase-out | | 265,200 | 300,850 | 168,275 | 336,550 | 336,550 |
| | Adoption Credit | | 195,860 | 195,860 | n/a unless married living apart | 195,860 | 195,860 |

NLWS—Not Living with Spouse
LWS—Living with Spouse

What is claimed is:

1. A computerized method for identifying tax savings opportunities for a taxpayer comprising the computer implemented steps of:
   (a) entering in a tax return preparation program executing on a computer current tax year tax data for said taxpayer to prepare a tax return for a current tax year using said tax return preparation program;
   (b) determining an adjusted gross income for said taxpayer based on said current tax year tax data for said taxpayer entered in said tax return preparation program executing on said computer;
   (c) providing said adjusted gross income value to a tax savings component in communication with said tax preparation program executing on said computer;
   (d) in response to receiving said adjusted gross income at said tax savings component executing on said computer, applying income phase-out rules of a tax code to said adjusted gross income value to determine adjustments to said adjusted gross income that result in tax savings for said taxpayer for said current tax year;
   (e) determining in said tax savings component executing on said computer tax savings resulting from application of said adjustments to said adjusted gross income value;
   (f) repeating steps (d) and (e) until application of said income phase-out rules does not identify adjustments to said adjusted gross income value that result in tax savings for said taxpayer for said current tax year;
   (g) generating for display in said tax return preparation program executing on said computer onscreen messages explaining said tax savings; and
   (h) presenting said onscreen messages in said tax return preparation program executing on said computer applicable to said tax return for said current tax year without changing said current tax year tax data entered in said tax return preparation program.

2. The method of claim 1 wherein said adjustments are selected from the group consisting of deductions, exemptions, and credits.

3. The method of claim 1 wherein determining an adjusted gross income for said taxpayer comprises determining an adjusted gross income based on a federal tax code.

4. The method of claim 1 further comprising printing said onscreen messages for said taxpayer.

5. The method of claim 1 wherein determining a tax savings for said taxpayer for said current tax year by applying adjustments to said adjusted gross income comprises comparing said adjusted gross income to phase-out ranges in said tax code.

* * * * *